US007647401B1

(12) United States Patent
Collet et al.

(10) Patent No.: US 7,647,401 B1
(45) Date of Patent: Jan. 12, 2010

(54) SYSTEM AND METHOD FOR MANAGING RESOURCES OF A NETWORK LOAD BALANCER VIA USE OF A PRESENCE SERVER

(75) Inventors: Jean-Luc Collet, La Gaude (FR); Francois-Xavier Drouet, La Gaude (FR); Fabien Lanne, Valbonne (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/250,564

(22) Filed: Oct. 14, 2008

(30) Foreign Application Priority Data

Oct. 3, 2008 (EP) .................................. 08305640

(51) Int. Cl.
G06F 15/173 (2006.01)
(52) U.S. Cl. ...................................... 709/224; 709/226
(58) Field of Classification Search ................. 709/224, 709/226, 206, 207
See application file for complete search history.

(56) References Cited

U.S. PATENT DOCUMENTS

| 5,774,660 | A | * | 6/1998 | Brendel et al. | ............... | 709/206 |
| 6,259,705 | B1 | * | 7/2001 | Takahashi et al. | ........... | 370/465 |
| 2002/0029268 | A1 | * | 3/2002 | Baca et al. | .................. | 709/224 |
| 2003/0083892 | A1 | * | 5/2003 | Ramachandran et al. | ....... | 705/1 |
| 2003/0084145 | A1 | * | 5/2003 | Ramachandran et al. | ..... | 709/224 |
| 2005/0138112 | A1 | * | 6/2005 | Sagar et al. | .................. | 709/203 |
| 2005/0232250 | A1 | * | 10/2005 | Craig et al. | .................. | 370/352 |
| 2006/0224744 | A1 | | 10/2006 | Rao et al. | | |

OTHER PUBLICATIONS

Candea, G.; Kiciman, E.; Zhang, S.; Keyani, P.; Fox, A., "JAGR: an autonomous self-recovering application server," Autonomic Computing Workshop, 2003 , vol., No., pp. 168-177, Jun. 25, 2003.*
Cardellini, V.; Colajanni, M.; Yu, P.S., "Dynamic load balancing on Web-server systems," Internet Computing, IEEE , vol. 3, No. 3, pp. 28-39, May/Jun. 1999.*

* cited by examiner

*Primary Examiner*—Patrice Winder
*Assistant Examiner*—Ajay Bhatia
(74) *Attorney, Agent, or Firm*—Schmeiser, Olsen & Watts

(57) ABSTRACT

A system and associated method for managing resources of a network load balancer. The method begins with registering the network load balancer with the presence server. Next the network load balancer notifies the presence server when an end user requests resources from an application server connected to the network load balancer. The network load balancer then provides the end user access to the application server and subscribes to an information feed pertaining to the end user and supplied by the presence server. After receiving a notification from the presence server that the end user changed their presence information, the network load balancer updates their records pertaining to the end user in a database. Finally, the network load balancer determines whether to continue providing the end user with access to the application server or purge the end user's records from the database.

25 Claims, 4 Drawing Sheets

SYSTEM AND METHOD FOR MANAGING RESOURCES OF A NETWORK LOAD BALANCER VIA USE OF A PRESENCE SERVER

BACKGROUND OF THE INVENTION

The present invention relates generally to network load balancing, and more specifically to managing resources of a network load balancer through the use of a presence server.

Internet servers supporting mission-critical applications (i.e. financial transactions, database access, corporate intranets, etc.) must run continuously. Additionally, networks need the ability to scale performance to handle large numbers of end user requests without creating unwanted delays. Clustering provides a solution to scalability for it enables a group of independent servers to be managed as a single system.

Network load balancing distributes traffic to multiple instances of an application, each instance running on a server within the cluster. Network load balancing transparently partitions the end user requests among the internet servers. From the end user's point of view, the cluster appears to be a single internet server answering requests.

Conventionally, the network load balancer manages end user sessions; storing such information on each user's session to a database. As the number of end users utilizing an application increases, so too does the size of the database used by the network load balancer to store end user session information.

SUMMARY OF THE INVENTION

The present invention provides a method for managing resources of a network load balancer via use of a presence server, the method comprising:

registering with said presence server, said registering being performed by said network load balancer;

after said registering, notifying said presence server of an end user requesting resources from an application server, said application server being connected to said network load balancer, said notifying being performed by said network load balancer;

after said notifying, providing said end user access to said application server by means of a network path monitored by said network load balancer, said providing being performed by said network load balancer;

after said providing, subscribing to an information feed being supplied by said presence server, said information feed pertaining to said end user, said subscribing being performed by said network load balancer;

after said subscribing, receiving from said presence server a notification that presence information pertaining to said end user changed, said presence server sending said notification in response to said presence information pertaining to said end user having changed, said receiving being performed by said network load balancer;

after said receiving, identifying whether said end user was utilizing resources of said application server at the time said presence server sent said notification, said identifying being performed by said network load balancer; and having identified said end user was utilizing said resources of said application server at the time said presence server sent said notification, attempting to re-establish a connection between said end user and said network load balancer by sending a message having parameter UUID to said presence server, said UUID being a unique user identification value assigned to said end user, said attempting being performed by said network load balancer;

having identified said end user was not utilizing said resources of said application server at the time said presence server sent said notification, unsubscribing from said information feed being supplied by said presence server; after said unsubscribing, unregistering with said presence server; and purging from a database connected to said network load balancer presence information corresponding to said end user, said unsubscribing and said unregistering and said purging being performed by said network load balancer.

DETAILED DESCRIPTION OF THE DRAWINGS

Definitions

The term presence information as used herein is defined as the details regarding an end user's ability to communicate via set of communication services.

The term AppUID is defined as a unique identifier for a network load balancer.

The term AppType as used herein is defined as a numerical value indicating the application type for a network load balancer.

The term IPAddress as used herein is defined as the unique internet protocol (IP) address of a network load balancer.

The term UUID as used herein is defined as a unique user identification value assigned to a particular end user.

The term UUID-Info as used herein is defined as any other information gathered by a presence server with respect to a specific end user.

The term Status as used herein is defined as a numerical value representing the status state of an end user.

The term StatusType as used herein is defined as a numerical value detailing the type of notification being sent by a network load balancer.

The term Type as used herein is defined as a numerical value detailing a specific application session a network load balancer wishes to restore.

Specification

Although certain embodiments of the present invention are described herein, it is understood that modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

Figure 1:
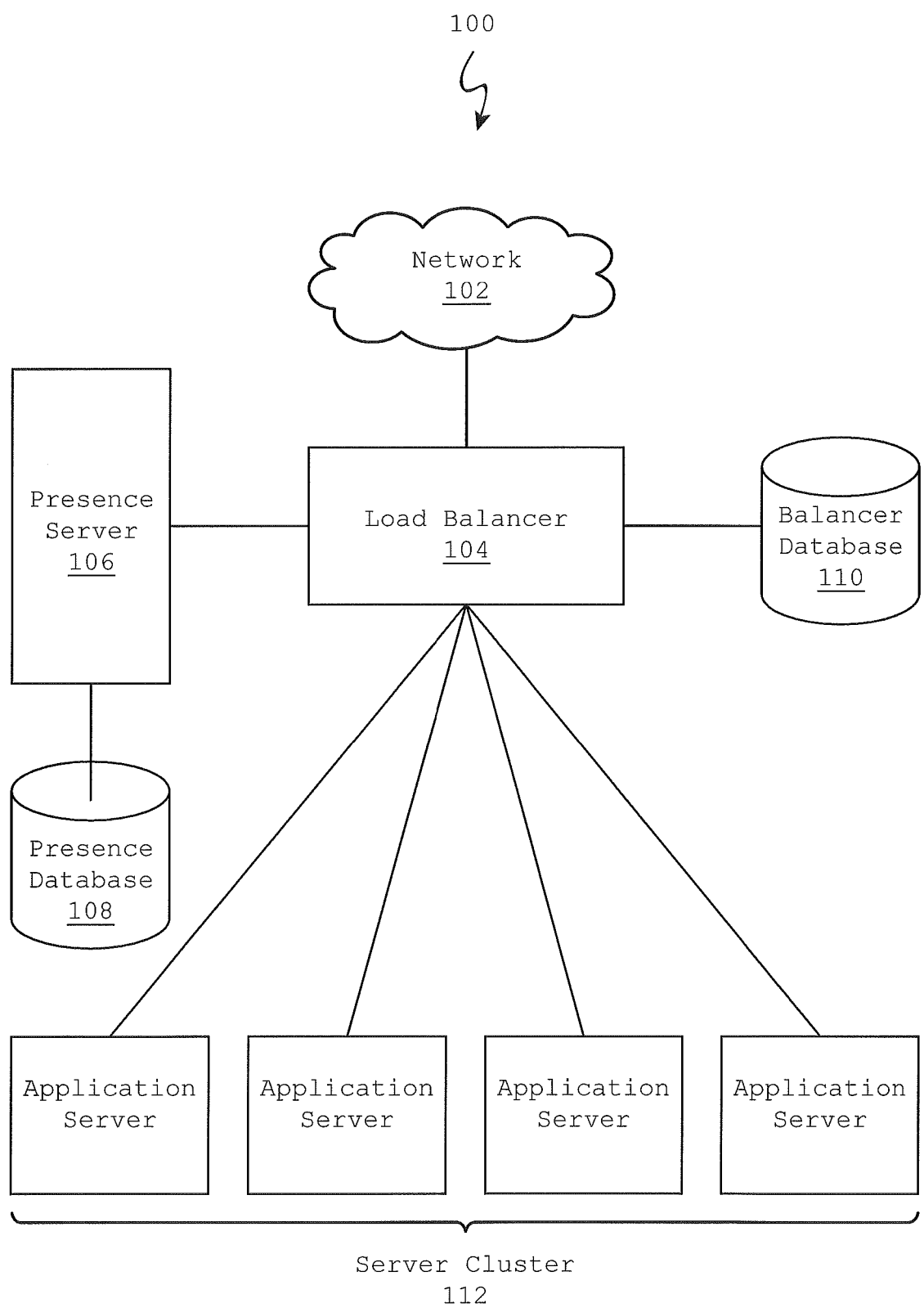
FIG. 1 illustrates an exemplary internal network environment capable of managing resources of a network load balancer via use of a presence server, in accordance with embodiments of the present invention.

FIG. 1 illustrates an exemplary internal network environment 100 capable of managing resources of a network load balancer 104 via use of a presence server 106, in accordance with embodiments of the present invention.

The network environment 100 comprise a presence server 106 connected to a network load balancer 104. The network load balancer 104 in turn is connected to a multitude of application servers collectively referred to as a server cluster 112. The network load balancer 104 is further connected to a network 102; the network being, inter alia, the Internet, an intranet, an extranet, a Virtual Private Network (VPN), etc.

A balancer database 110 is connected to the network load balancer 104. The balancer database 110 is responsible for storing routing and presence information on each end user accessing the server cluster 112 through the network 102 by means of the network load balancer 104.

Finally, a presence database 108 is connected to the presence server 106. The presence database 108 is responsible for storing presence information on each end user accessing the server cluster 112 through the network 102 by means of the network load balancer 104.

When an end user requests access to the server cluster 112, the network load balancer 104 creates and therein reserves a path for the end user to one of the application servers. The path created by the network load balancer 104 for the end user is stored in the balancer database 110. The presence server 106 is notified of the end user's access to the server cluster 112 to which the presence server 106 stores presence information about the end user to the presence database 108.

Figure 2:
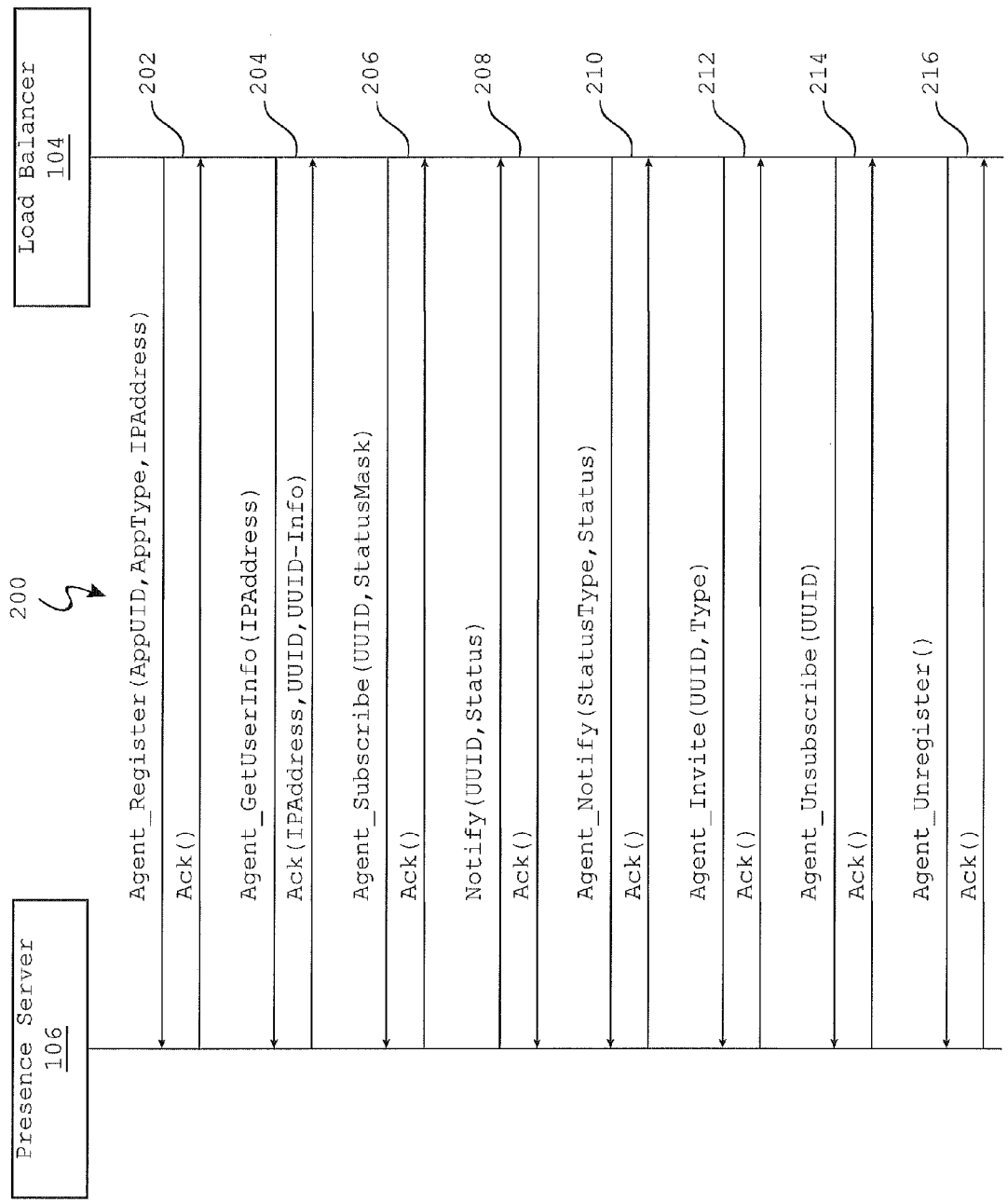
FIG. 2 illustrates correspondence between a presence server and a network load balancer, in accordance with embodiments of the present invention.

FIG. 2 illustrates correspondence 200 between a presence server 106 and a network load balancer 104, in accordance with embodiments of the present invention.

Message 202 is an Agent_Register request sent by the network load balancer 104 to the presence server 106. The Agent_Register message 202 is the first message exchanged between the network load balancer 104 and the presence server 106 and it is used to initiate communication between the parties. The Agent_Register message 202 comprises the parameters AppUID, AppType, and IPAddress. The AppUID parameter is a unique identifier for the network load balancer 104. The AppType parameter is a numerical value indicating the application type for the network load balancer 104. The IPAddress parameter is the unique internet protocol (IP) address of the network load balancer 104. In response to receiving the Agent_Register message 202, the presence server 106 returns to the network load balancer 104 a standard acknowledgement message (ACK( )).

Message 204 is an Agent_GetUserInfo message sent by the network load balancer 104 to the presence server 106. The Agent_GetUserInfo message 204 allows the network load balancer 104, when it receives a request from an end user, to retrieve from the presence server 106 presence information about the end user and subsequently store the presence information in the balancer database 110. The Agent_GetUserInfo message 204 comprises the parameter IPAddress. The parameter IPAddress is unique to each end user accessing the server cluster 112 and therefore can uniquely identify each end user in both the presence database 108 and the balancer database 110.

In response to receiving the Agent_GetUserInfo message 204, the presence server 106 responds with an acknowledgement message comprising the parameters IPAddress, UUID, and UUID-Info. The parameter IPAddress sent by the presence server 106 is compared to the IPAddress sent by the network load balancer 104 in message 204 to ensure the information provided by the presence server 106 pertains to the correct end user. The parameter UUID is a unique user identification value assigned to the particular end user residing at the IP address identified with respect to IPAddress. The parameter UUID-Info comprises any other information gathered by the presence server 106 with respect to the specific end user.

Message 206 is an Agent_Subscribe message sent by the network load balancer 104 to the presence server 106. The Agent_Subscribe message 206 allows the network load balancer 104 to subscribe to a notification feed provided by the presence server 106 regarding the status change corresponding to the user having a particular UUID. The notification feed may include, inter alia, information gathered by the presence server 106 regarding the status, change in status, length of connection, type of connection, etc., pertaining to the specific end user.

The Agent_Subscribe message 206 comprises the parameters UUID and StatusMask. The parameter UUID is a unique user identification value assigned to a particular end user the network load balancer 104 wishes to receive notification information about. In response to receiving the Agent_Subscribe message 206, the presence server 106 sends to the network load balancer 104 a standard acknowledgement response (ACK( )).

Message 208 is a Notify message sent by the presence server 106 to the network load balancer 104. The Notify message 208 allows the presence server 106 to notify the network load balancer 104 that a specific end user's presence changed (e.g. status state unavailable, available, etc.). The Notify message 208 comprises the parameters UUID and Status. The UUID parameter is a unique user identification value assigned to the particular end user to which the particular Notify message 208 pertains. The Status parameter is a numerical value representing the new status state of the end user In response to receiving the Notify message 208, the network load balancer 104 stores in the balancer database 110 the new Status value for the end user having the UUID matching that sent by the presence server 106. In addition, the network load balancer responds to the presence server 106 with a standard acknowledgement message (ACK( )).

Message 210 is an Agent_Notify message sent by the network load balancer 104 to the presence server 106. The Agent_Notify message 210 notifies the presence server 106 of a status change to the network load balancer 104. The Agent_Notify message 210 comprises the parameters StatusType and Status. The StatusType parameter is a numerical value detailing the type of notification (e.g. 1 Connectivity status change, etc.) being sent by the network load balancer 104. The Status parameter is a numerical value representing the new status state of the network load balancer 104. In response to receiving the Agent_Notify message 210, the presence server 106 updates in the presence database 108 the presence information corresponding to the network load balancer 104. Additionally, the presence server responds with a standard acknowledgement message (ACK( )).

Message 212 is an Agent_Invite message sent by the network load balancer 104 to the presence server 106. The Agent_Invite message 212 allows the network load balancer 104 to request the presence server 106 to initiate a connection request with a specific end user. The Agent_Invite message 212 allows the network load balancer to act as a delegated presence server and initiate calls or connectivity changes without losing a session with a specific end user. In short, the Agent_Invite message 212 allows the network load balancer 104 to start an application session with a specific end user via a given network connection, then stop the given network connection, finally to restart the application session by means of a different connectivity path and/or even a different device.

For example, the network load balancer 104 receives a Agent_Notify message 208 from the presence server that a specific end user (e.g. UUID of 57691) connection is lost. Based on the network load balancer 104 configuration it can send an Agent_Invite message 212 to the presence server to determine another way to restore connectivity with the specific end user having the UUID of 57691. The alternative connectivity may be, inter alia, a different path, a different protocol, etc., all based on information stored in the presence database 108 corresponding to the specific end user having a UUID of 57691.

The Agent_Invite message 212 comprises the parameters UUID and Type. The UUID parameter is a unique user identification value assigned to a particular end user to which the particular Agent_Invite message 212 pertains. The Type parameter is a numerical value detailing the specific application session the network load balancer 104 wishes to restore. In response to receiving the Agent_Invite message 212, the presence server 106 responds with a standard acknowledgement message (ACK( )).

Message 214 is an Agent_Unsubscribe message sent by the network load balancer 104 to the presence server 106. The Agent_Unsubscribe message 214 allows the network load balancer 104 to unsubscribe to a notification feed provided by the presence server 106 regarding the status of the end user having a particular UUID. The Agent_Unsubscribe message 214 comprises the parameter UUID. The UUID parameter is a unique user identification value assigned to a particular end user to which the network load balancer wishes to stop receiving notification feeds about. In response to receiving the Agent_Unsubscribe message 214, the presence server responds with a standard acknowledgement message (ACK( )).

Message 216 is an Agent_Unregister message sent by the network load balancer 104 to the presence server 106. The Agent_Unregister message 216 allows the network load balancer 104 to unregister from the presence server 106, effectively becoming unavailable to the presence server 106. The Agent_Unregister message 216 comprises no parameters. In response to receiving the Agent_Unregister message 216, the presence server purges presence information in the presence database 108 pertaining to the network load balancer 104. Additionally, the presence server 106 responds with a standard acknowledgement message (ACK( )).

Figure 3:
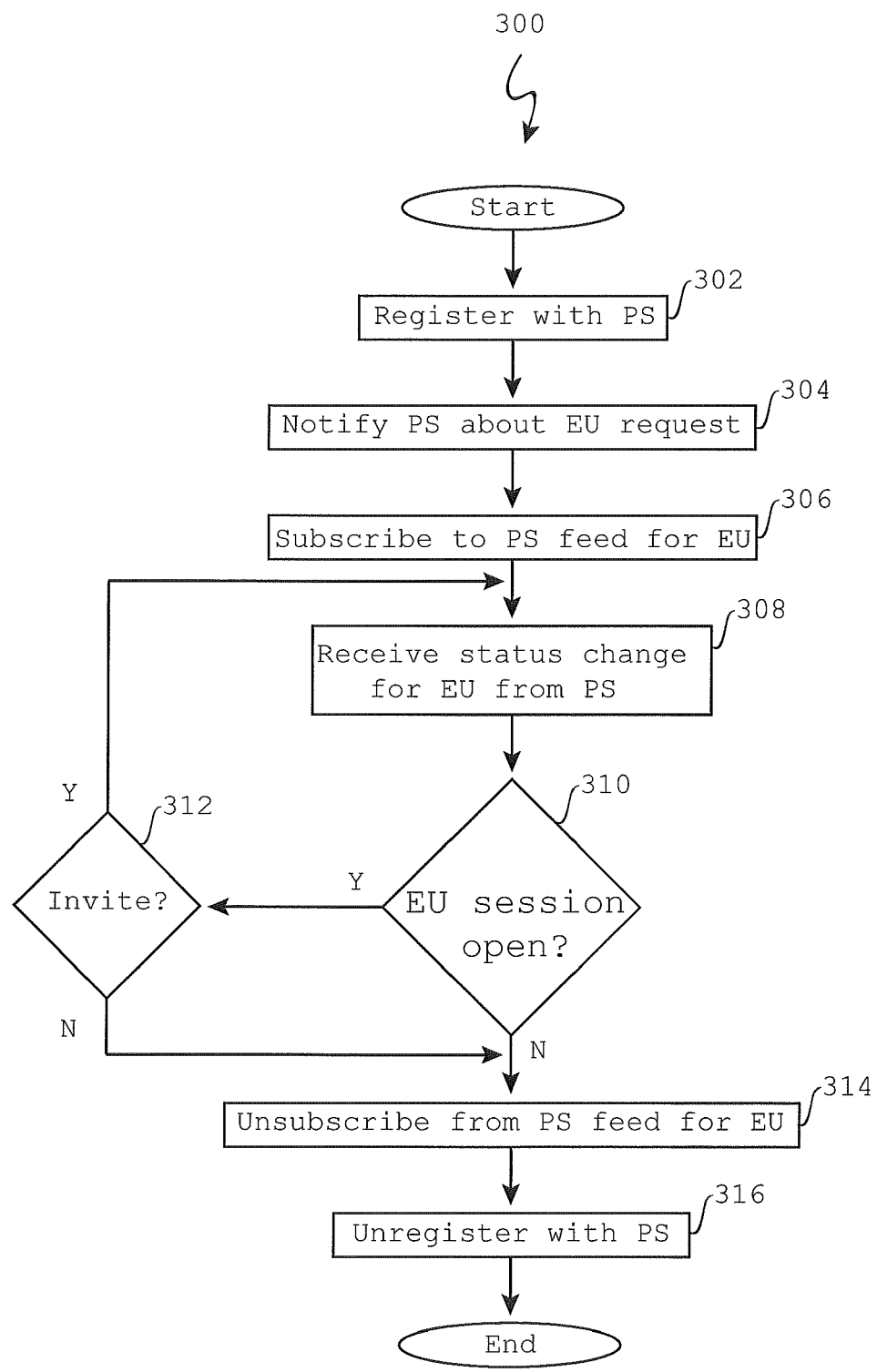
FIG. 3 illustrates a method for managing resources of a network load balancer via use of a presence server, in accordance with embodiments of the present invention.

FIG. 3 illustrates a method 300 for managing resources of a network load balancer 104 (see FIG. 1, supra) via use of a presence server 106 (see FIG. 1, supra), in accordance with embodiments of the present invention. The method 300 begins with step 302 in which a network load balancer 104 registers with a presence server (PS) 106.

Step 302 comprises a network load balancer 104 registering with a presence server (PS) 106 (see FIG. 1, supra). The network load balancer 104 sends an Agent_Register message 202 (see FIG. 2, supra) to the presence server 106. The Agent_Register message 202 comprises the parameters AppUID, AppType, and IPAddress (see FIG. 2, supra). The presence server 106 stores the received parameters as presence information corresponding to the network load balancer 104 in a presence database 108 connected to the presence server 106 (see FIG. 1, supra).

In response to registering with the presence server (PS) 106, the network load balancer 104 receives from the presence server (PS) an acknowledgement message. After completion of step 302, the method 300 continues with step 304 in which the network load balancer 104 notifies the presence server (PS) about an end user (EU) request.

Step 304 comprises the network load balancer notifying the presence server (PS) 106 about a unique end user (EU) requesting access to resources located on an application server connected to the network load balancer 104 (see FIG. 1, supra). The notification sent to the presence server (PS) 106 is in response to the network load balancer 104 receiving a request from an end user to access resources residing on an application server which therein resides in the server cluster 112.

The notification in step 304 comprises an Agent_GetUserInfo message 204 which therein comprises the parameter IPAddress (see FIG. 2, supra). In response to submitting the Agent_GetUserInfo message 204, the network load balancer 104 receives from the presence server 106 an acknowledgement message comprising the parameters IPAddress, UUID, and UUID-Info. Upon receipt of the parameters IPAddress, UUID, and UUID-Info, the network load balancer 104 stores said parameters as presence information in a balancer database 110 connected to the network load balancer 104.

After completion of step 304, the method 300 continues with the network load balancer 104 subscribing to a notification feed provided by the presence server (PS) 106 and pertaining to the end user (EU).

Step 306 comprises the network load balancer 104 subscribing to a notification feed providing by the presence server (PS) 106 and pertaining to the end user (EU). Specifically, the network load balancer 104 sends to the presence server (PS) 106 an Agent_Subscribe message 206 comprising the parameters UUID and StatusMask (see FIG. 2, supra). In response to sending the presence server (PS) 106 the Agent_Subscribe message 206, the network load balancer 104 receives from the presence server (PS) 106 a standard acknowledgement message. From then on and until a subsequent Notify message 208, the presence server provides presence information about the specific end user to the network load balancer 104 (see FIG. 2, supra). After completion of step 306, the method 300 continues with step 308 in which the network load balancer 104 receives from the presence server 106 a status change notification.

Step 308 comprises the network load balancer 104 receiving a status change notification from the presence server 106. The notification received by the network load balancer 104 comprises a Notify message 208 (see FIG. 2, supra). The Notify message 208 therein comprises a UUID corresponding to a specific end user whose information resides in the balancer database 110 (see FIG. 1, surpa). The Notify message 208 further comprises a Status parameter identifying the current presence status for the specific end user corresponding to the UUID included. In response to receiving the Notify message 208, the network load balancer 104 updates the specific end user's (EU) presence information residing in the balancer database 110. After completion of step 308, the method 300 continues with step 310 in which the network load balancer 104 determines whether the specific end user (EU) utilized application resources residing in the server cluster 112 at the time the Notify message 208 was received.

Step 310 comprises the network load balancer 104 determining whether the specific end user (EU) utilized application resources residing in the server cluster 112 at the time the Notify message 208 was received. The specific end user (EU) referred to in step 310 is the same end user identified in step 308. The network load balancer 104 reviews in the balancer database 110 the presence information pertaining to the specific end user corresponding to the UUID received with respect to step 308.

If the end user (EU) was utilizing application resources at the time the network load balancer 104 received the status change with respect to step 308, the method 300 continues with step 312 in which the network load balancer 104 attempts to re-establish a connection with the specific end user through the use of an Invite message.

However, if the end user (EU) was not utilizing application resources at the time the network load balancer 104 received the status change with respect to step 308, the method 300 continues with step 314 in which the network load balancer 104 unsubscribes from the notification feed provided by the presence server (PS) 106 and pertaining to the end user (EU).

Step 312 comprises the network load balancer 104 attempting to re-establish a connection with the specific end user (EU) by means of an Agent_Invite message 212 (see FIG. 2, supra) being sent to the presence server 106. If the Agent_Inite message 212 successfully re-establishes the application session between the network load balancer 104 and the specific end user, the network load balancer 104 updates the specific end user's presence information in the balancer database 110 with the new connection information. Additionally, the network load balancer 104 continues to receive notification feeds provided by the presence server (PS) 106 and pertaining to the end user (EU) until a subsequent status change message is received pursuant to step 308.

However, if the Agent_Inite message 212 does not successfully re-establish the application session between the network load balancer 104 and the specific end user (e.g. the presence server cannot find the end user), method 300 continues with step 314 in which the network load balancer 104 unsubscribes from the notification feed provided by the presence server (PS) 106 and pertaining to the end user (EU).

Step 314 comprises the network load balancer 104 unsubscribing from the notification feed provided by the presence server (PS) 106 and pertaining to the end user (EU). The unsubscription is facilitated by means of an Agent_Unsubscribe message 214 sent by the network load balance 104 to the presence server 106 (see FIG. 2, supra). In response to sending the Agent_Unsubscribe message 214, the network load balancer receives from the presence server 106 a standard acknowledgement message. After completion of step 314, the method 300 continues with step 316 in which the network load balancer 104 unregisters from the presence server 106.

Step 316 comprises the network load balancer 104 unsubscribing from the presence server 106 by means of an Agent_Unregister message 216 (see FIG. 2, supra). In response to the network load balancer 104 sending the Agent_Unregister message 216, the presence server 106 responds with a standard acknowledgement message. Thereafter the network load balancer 104 purges all presence information corresponding to the specific end user from the balancer database 110 (see FIG. 1, supra). After completion of step 316, the method 300 ends.

Figure 4:
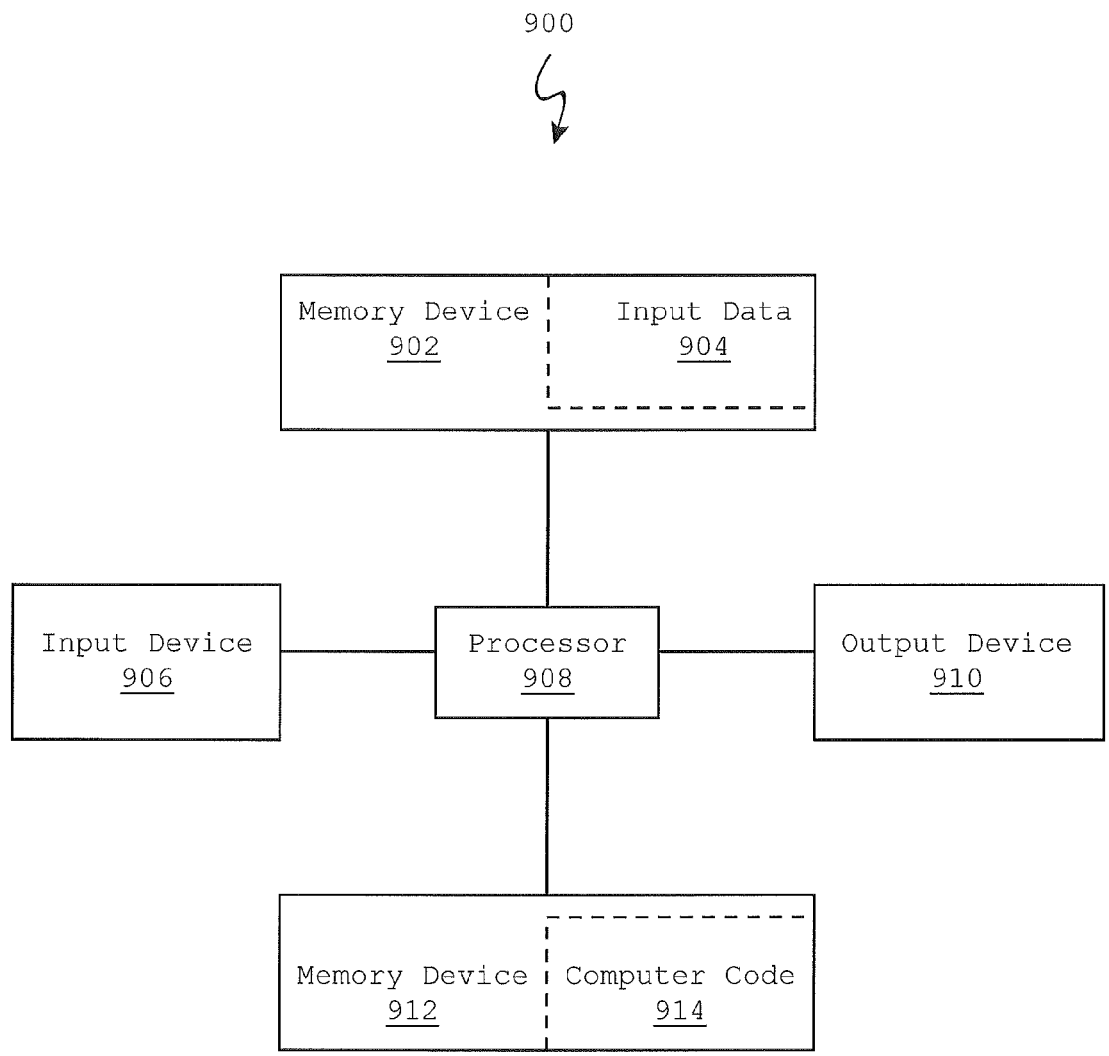
FIG. 4 illustrates a computer system which may facilitate a method for managing resources of a network load balancer via use of a presence server, in accordance with embodiments of the present invention.

FIG. 4 illustrates a computer system which may facilitate a method for managing resources of a network load balancer via use of a presence server, in accordance with embodiments of the present invention.

The computer system 900 comprises a processor 908, an input device 906 coupled to the processor 908, an output device 910 coupled to the processor 908, and memory devices 902 and 912 each coupled to the processor 908.

The input device 906 may be, inter alia, a keyboard, a mouse, a keypad, a touchscreen, a voice recognition device, a sensor, a network interface card (NIC), a Voice/video over Internet Protocol (VoIP) adapter, a wireless adapter, a telephone adapter, a dedicated circuit adapter, etc.

The output device 910 may be, inter alia, a printer, a plotter, a computer screen, a magnetic tape, a removable hard disk, a floppy disk, a NIC, a VoIP adapter, a wireless adapter, a telephone adapter, a dedicated circuit adapter, an audio and/or visual signal generator, a light emitting diode (LED), etc.

The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions.

The computer code 914 includes, inter alia, an algorithm used for managing resources of a network load balancer via use of a presence server according to the present invention. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 4) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for managing resources of a network load balancer via use of a presence server. Thus, the present invention discloses a process for supporting computer infrastructure, comprising integrating, hosting, maintaining and deploying computer-readable code into a computing system (e.g., computing system 900), wherein the code in combination with the computing system is capable of performing a method for managing resources of a network load balancer via use of a presence server.

In another embodiment, the invention provides a business method that performs the process steps of the invention on a subscription, advertising and/or fee basis. That is, a service provider, such as a Solution Integrator, can offer to create, maintain, support, etc. managing resources of a network load balancer via use of a presence server. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 4 shows the computer system 900 as a particular configuration of hardware and software, any configuration of hardware and software, as would be known to a person of ordinary skill in the art, may be utilized for the purposes stated supra in conjunction with the particular computer system 900 of FIG. 4. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for managing resources of a network load balancer via use of a presence server, the method comprising:
registering with said presence server, said registering being performed by said network load balancer;
after said registering, notifying said presence server of an end user requesting resources from an application server, said application server being connected to said network load balancer, said notifying being performed by said network load balancer;
after said notifying, providing said end user access to said application server by means of a network path monitored by said network load balancer, said providing being performed by said network load balancer;
after said providing, subscribing to an information feed being supplied by said presence server, said information feed pertaining to said end user, said subscribing being performed by said network load balancer;
after said subscribing, receiving from said presence server a notification that presence information pertaining to said end user changed, said presence server sending said notification in response to said presence information pertaining to said end user having changed, said receiving being performed by said network load balancer;
after said receiving, identifying whether said end user was utilizing resources of said application server at the time said presence server sent said notification, said identifying being performed by said network load balancer; and
having identified said end user was utilizing said resources of said application server at the time said presence server sent said notification, attempting to re-establish a connection between said end user and said network load balancer by sending a message having parameter UUID to said presence server, said UUID being a unique user identification value assigned to said end user, said attempting being performed by said network load balancer;
having identified said end user was not utilizing said resources of said application server at the time said presence server sent said notification, unsubscribing from said information feed being supplied by said presence server; after said unsubscribing, unregistering with said presence server; and purging from a database connected to said network load balancer presence information corresponding to said end user, said unsubscribing and said unregistering and said purging being performed by said network load balancer.

2. The method of claim 1, after being able to re-establish said connection between said end user and said network load balancer, said method further comprising:
monitoring said information feed being supplied by said presence server for a subsequent said notification that presence information pertaining to said end user changed, said monitoring being performed by said network load balancer.

3. The method of claim 1, after being unable to re-establish said connection between said end user and said network load balancer, said method further comprising:
unsubscribing from said information feed being supplied by said presence server, said unsubscribing being performed by said network load balancer;
after said unsubscribing, unregistering with said presence server, said unregistering being performed by said network load balancer; and
purging from a database connected to said network load balancer presence information corresponding to said end user, said purging being performed by said network load balancer.

4. The method of claim 1, said registering with said presence server comprising:
sending to said presence server an Agent_Register message having parameters AppUID and AppType and IPAddress, said AppUID being a unique identifier for said network load balancer, said AppType being a numerical value indicating an application type for said network load balancer, said IPAddress being a unique internet protocol (IP) address of said network load balancer; and
receiving an acknowledgement message from said presence server in response to said sending.

5. The method of claim 1, said notifying said presence server of said end user requesting resources from said application server comprising:
sending said presence server an Agent_GetUserInfo message having a parameter IPAddress, said IPAddress being a unique internet protocol (IP) address of said network load balancer;
receiving an acknowledgement message having parameters IPAddress and UUID and UUID-Info from said presence server in response to said sending, said UUID being a unique user identification value assigned to said end user, said UUID-Infor being any other information gathered by said presence server with respect to said end user; and
storing said parameters IPAddress and UUID and UUID-Info as presence information in a database being connected to said network load balancer.

6. The method of claim 1, said subscribing to said information feed being supplied by said presence server comprising:
sending said presence server an Agent_Subscribe message having parameter UUID, said UUID being a unique user identification value assigned to said end user; and
receiving an acknowledgement message from said presence server in response to said sending.

7. The method of claim 1, said receiving from said presence server said notification that presence information pertaining to said end user changed further comprising:
receiving a Notify message having parameters UUID and Status from said presence server, said UUID being a unique user identification value assigned to said end user, said Status being a numerical value representing the status state of said end user; and
storing said parameters UUID and Status as presence information in a database being connected to said network load balancer.

8. A computer program product, comprising a computer-usable storage medium having a computer-readable program code stored therein, said computer-readable program code containing instructions that when executed by a processor of a computer system implement a method for managing resources of a network load balancer via use of a presence server, the method comprising:
registering with said presence server, said registering being performed by said network load balancer;
after said registering, notifying said presence server of an end user requesting resources from an application server, said application server being connected to said network load balancer, said notifying being performed by said network load balancer;

after said notifying, providing said end user access to said application server by means of a network path monitored by said network load balancer, said providing being performed by said network load balancer;

after said providing, subscribing to an information feed being supplied by said presence server, said information feed pertaining to said end user, said subscribing being performed by said network load balancer;

after said subscribing, receiving from said presence server a notification that presence information pertaining to said end user changed, said presence server sending said notification in response to said presence information pertaining to said end user having changed, said receiving being performed by said network load balancer;

after said receiving, identifying whether said end user was utilizing resources of said application server at the time said presence server sent said notification, said identifying being performed by said network load balancer; and having identified said end user was utilizing said resources of said application server at the time said presence server sent said notification, attempting to re-establish a connection between said end user and said network load balancer by sending a message having parameter UUID to said presence server, said UUID being a unique user identification value assigned to said end user, said attempting being performed by said network load balancer;

having identified said end user was not utilizing said resources of said application server at the time said presence server sent said notification, unsubscribing from said information feed being supplied by said presence server; after said unsubscribing, unregistering with said presence server; and purging from a database connected to said network load balancer presence information corresponding to said end user, said unsubscribing and said unregistering and said purging being performed by said network load balancer.

9. The computer program product of claim 8, after being able to re-establish said connection between said end user and said network load balancer, said method further comprising:
monitoring said information feed being supplied by said presence server for a subsequent said notification that presence information pertaining to said end user changed, said monitoring being performed by said network load balancer.

10. The computer program product of claim 8, after being unable to re-establish said connection between said end user and said network load balancer, said method further comprising:
unsubscribing from said information feed being supplied by said presence server, said unsubscribing being performed by said network load balancer;
after said unsubscribing, unregistering with said presence server, said unregistering being performed by said network load balancer; and
purging from a database connected to said network load balancer presence information corresponding to said end user, said purging being performed by said network load balancer.

11. The computer program product of claim 8, said registering with said presence server comprising:
sending to said presence server an Agent_Register message having parameters AppUID and AppType and IPAddress, said AppUID being a unique identifier for said network load balancer, said AppType being a numerical value indicating an application type for said network load balancer, said IPAddress being a unique internet protocol (IP) address of said network load balancer; and
receiving an acknowledgement message from said presence server in response to said sending.

12. The computer program product of claim 8, said notifying said presence server of said end user requesting resources from said application server comprising:
sending said presence server an Agent_GetUserInfo message having a parameter IPAddress, said IPAddress being a unique internet protocol (IP) address of said network load balancer;
receiving an acknowledgement message having parameters IPAddress and UUID and UUID-Info from said presence server in response to said sending, said UUID being a unique user identification value assigned to said end user, said UUID-Infor being any other information gathered by said presence server with respect to said end user; and
storing said parameters IPAddress and UUID and UUID-Info as presence information in a database being connected to said network load balancer.

13. The computer program product of claim 8, said subscribing to said information feed being supplied by said presence server comprising:
sending said presence server an Agent_Subscribe message having parameter UUID, said UUID being a unique user identification value assigned to said end user; and
receiving an acknowledgement message from said presence server in response to said sending.

14. The computer program product of claim 8, said receiving from said presence server said notification that presence information pertaining to said end user changed further comprising:
receiving a Notify message having parameters UUID and Status from said presence server, said UUID being a unique user identification value assigned to said end user, said Status being a numerical value representing the status state of said end user; and
storing said parameters UUID and Status as presence information in a database being connected to said network load balancer.

15. A computing system comprising a processor coupled to a computer-readable memory unit, said memory unit comprising a software application, said software application comprising instruction that when executed by said processor, implement a method for managing resources of a network load balancer via use of a presence server, the method comprising:
registering with said presence server, said registering being performed by said network load balancer;
after said registering, notifying said presence server of an end user requesting resources from an application server, said application server being connected to said network load balancer, said notifying being performed by said network load balancer;
after said notifying, providing said end user access to said application server by means of a network path monitored by said network load balancer, said providing being performed by said network load balancer;
after said providing, subscribing to an information feed being supplied by said presence server, said information feed pertaining to said end user, said subscribing being performed by said network load balancer;
after said subscribing, receiving from said presence server a notification that presence information pertaining to said end user changed, said presence server sending said notification in response to said presence information pertaining to said end user having changed, said receiving being performed by said network load balancer;

after said receiving, identifying whether said end user was utilizing resources of said application server at the time said presence server sent said notification, said identifying being performed by said network load balancer; and having identified said end user was utilizing said resources of said application server at the time said presence server sent said notification, attempting to re-establish a connection between said end user and said network load balancer by sending a message having parameter UUID to said presence server, said UUID being a unique user identification value assigned to said end user, said attempting being performed by said network load balancer;

having identified said end user was not utilizing said resources of said application server at the time said presence server sent said notification, unsubscribing from said information feed being supplied by said presence server; after said unsubscribing, unregistering with said presence server; and purging from a database connected to said network load balancer presence information corresponding to said end user, said unsubscribing and said unregistering and said purging being performed by said network load balancer.

16. The computing system of claim 15, after being able to re-establish said connection between said end user and said network load balancer, said method further comprising:

monitoring said information feed being supplied by said presence server for a subsequent said notification that presence information pertaining to said end user changed, said monitoring being performed by said network load balancer.

17. The computing system of claim 15, after being unable to re-establish said connection between said end user and said network load balancer, said method further comprising:

unsubscribing from said information feed being supplied by said presence server, said unsubscribing being performed by said network load balancer;

after said unsubscribing, unregistering with said presence server, said unregistering being performed by said network load balancer; and purging from a database connected to said network load balancer presence information corresponding to said end user, said purging being performed by said network load balancer.

18. The computing system of claim 15, said registering with said presence server comprising:

sending to said presence server an Agent_Register message having parameters AppUID and AppType and IPAddress, said AppUID being a unique identifier for said network load balancer, said AppType being a numerical value indicating an application type for said network load balancer, said IPAddress being a unique internet protocol (IP) address of said network load balancer; and receiving an acknowledgement message from said presence server in response to said sending.

19. The computing system of claim 15, said notifying said presence server of said end user requesting resources from said application server comprising:

sending said presence server an Agent_GetUserInfo message having a parameter IPAddress, said IPAddress being a unique internet protocol (IP) address of said network load balancer;

receiving an acknowledgement message having parameters IPAddress and UUID and UUID-Info from said presence server in response to said sending, said UUID being a unique user identification value assigned to said end user, said UUID-Infor being any other information gathered by said presence server with respect to said end user; and storing said parameters IPAddress and UUID and UUID-Info as presence information in a database being connected to said network load balancer.

20. The computing system of claim 15, said subscribing to said information feed being supplied by said presence server comprising:

sending said presence server an Agent_Subscribe message having parameter UUID, said UUID being a unique user identification value assigned to said end user; and receiving an acknowledgement message from said presence server in response to said sending.

21. The computing system of claim 15, said receiving from said presence server said notification that presence information pertaining to said end user changed further comprising:

receiving a Notify message having parameters UUID and Status from said presence server, said UUID being a unique user identification value assigned to said end user, said Status being a numerical value representing the status state of said end user; and storing said parameters UUID and Status as presence information in a database being connected to said network load balancer.

22. A process for supporting computer infrastructure, said process comprising providing at least one support service for at least one of creating, integrating, hosting, maintaining, and deploying computer-readable code in a computing system, wherein said code in combination with the computing system is capable of implementing a method for managing resources of a network load balancer via use of a presence server, the method comprising:

registering with said presence server, said registering being performed by said network load balancer;

after said registering, notifying said presence server of an end user requesting resources from an application server, said application server being connected to said network load balancer, said notifying being performed by said network load balancer;

after said notifying, providing said end user access to said application server by means of a network path monitored by said network load balancer, said providing being performed by said network load balancer;

after said providing, subscribing to an information feed being supplied by said presence server, said information feed pertaining to said end user, said subscribing being performed by said network load balancer;

after said subscribing, receiving from said presence server a notification that presence information pertaining to said end user changed, said presence server sending said notification in response to said presence information pertaining to said end user having changed, said receiving being performed by said network load balancer;

after said receiving, identifying whether said end user was utilizing resources of said application server at the time said presence server sent said notification, said identifying being performed by said network load balancer; and having identified said end user was utilizing said resources of said application server at the time said presence server sent said notification, attempting to re-establish a connection between said end user and said network load balancer by sending a message having parameter UUID to said presence server, said UUID being a unique user identification value assigned to said end user, said attempting being performed by said network load balancer;

having identified said end user was not utilizing said resources of said application server at the time said presence server sent said notification, unsubscribing from said information feed being supplied by said presence server; after said unsubscribing, unregistering with said presence server; and purging from a database connected to said network load balancer presence information corresponding to said end user, said unsubscribing and said unregistering and said purging being performed by said network load balancer.

23. The process for supporting computer infrastructure of claim 22, after being able to re-establish said connection between said end user and said network load balancer, said method further comprising:

monitoring said information feed being supplied by said presence server for a subsequent said notification that presence information pertaining to said end user changed, said monitoring being performed by said network load balancer.

24. The process for supporting computer infrastructure of claim 22, after being unable to re-establish said connection between said end user and said network load balancer, said method further comprising:

unsubscribing from said information feed being supplied by said presence server, said unsubscribing being performed by said network load balancer;

after said unsubscribing, unregistering with said presence server, said unregistering being performed by said network load balancer; and purging from a database connected to said network load balancer presence information corresponding to said end user, said purging being performed by said network load balancer.

25. The process for supporting computer infrastructure of claim 22, said registering with said presence server comprising:

sending to said presence server an Agent_Register message having parameters AppUID and AppType and IPAddress, said AppUID being a unique identifier for said network load balancer, said AppType being a numerical value indicating an application type for said network load balancer, said IPAddress being a unique internet protocol (IP) address of said network load balancer; and receiving an acknowledgement message from said presence server in response to said sending.

* * * * *